(12) United States Patent
Sun et al.

(10) Patent No.: US 11,724,779 B2
(45) Date of Patent: Aug. 15, 2023

(54) LONG-TERM MOORING DEVICE

(71) Applicant: DALIAN UNIVERSITY OF TECHNOLOGY, Liaoning (CN)

(72) Inventors: Lei Sun, Dalian (CN); Chong Fu, Dalian (CN); Zhe Lin, Dalian (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 437 days.

(21) Appl. No.: 17/043,787

(22) PCT Filed: Mar. 17, 2020

(86) PCT No.: PCT/CN2020/079612
§ 371 (c)(1),
(2) Date: Sep. 30, 2020

(87) PCT Pub. No.: WO2021/017484
PCT Pub. Date: Feb. 4, 2021

(65) Prior Publication Data
US 2023/0096636 A1    Mar. 30, 2023

(30) Foreign Application Priority Data

Jul. 29, 2019 (CN) .......................... 201910687088.1
Jul. 29, 2019 (CN) .......................... 201921199341.0
Jul. 29, 2019 (CN) .......................... 201921199367.5

(51) Int. Cl.
*B63B 21/10* (2006.01)
*B63B 21/08* (2006.01)

(52) U.S. Cl.
CPC .............. *B63B 21/10* (2013.01); *B63B 21/08* (2013.01)

(58) Field of Classification Search
CPC ......... B63B 21/00; B63B 21/04; B63B 21/08; B63B 21/20; B63B 2021/001; B63B 2021/003; B63B 2021/005; B63B 2021/006
USPC .................................. 114/230.1, 230.27, 343
See application file for complete search history.

(56) References Cited

U.S. PATENT DOCUMENTS

| | | | | | |
|---|---|---|---|---|---|
| 3,060,885 | A | * | 10/1962 | Nolf .......................... | E02B 3/24 114/230.18 |
| 3,177,839 | A | * | 4/1965 | Nolf .......................... | E02B 3/24 114/230.18 |
| 7,314,015 | B1 | * | 1/2008 | Obahi ..................... | B63B 21/00 114/230.16 |

FOREIGN PATENT DOCUMENTS

CN        109878635 A  *  6/2019  ............. B63B 21/16

* cited by examiner

*Primary Examiner* — Daniel V Venne
(74) *Attorney, Agent, or Firm* — McCarter & English, LLP; Yu Lu

(57) ABSTRACT

The present invention provides a long-term mooring device. A support frame is provided on a dock. The dock is provided with a free guide roller. The free guide roller is wound with a cable. An upper end of the cable is horizontally connected to a spring fixed on a lower side of a cross arm of the support frame, through a free guide roller provided on the lower side of the cross arm of the support frame (corresponding to the free guide roller on the dock). The middle of the cable penetrates through an inertial induction self-locking connection joint fixed on an end of a platform arm. The platform arm is fixed on a platform. The present invention provides an omnidirectional restoring force for the moored platform through the elastic deformation of the springs to control the movement response of the platform within a certain range.

6 Claims, 5 Drawing Sheets

LONG-TERM MOORING DEVICE

CROSS-REFERENCE TO RELATED APPLICATIONS

This application is a U.S. national stage filing, under 35 U.S.C. § 371(c), of International Application No. PCT/CN2020/079612, filed on Mar. 17, 2020, which claims priority to Chinese Patent Application No. 201910687088.1, filed on Jul. 29, 2019, Chinese Patent Application No. 201921199367.5, filed on Jul. 29, 2019, and Chinese Patent Application No. 201921199341.0, filed on Jul. 29, 2019. The entire contents of each of the aforementioned applications are incorporated herein by reference.

TECHNICAL FIELD

The present invention relates to the technical field of mooring.

BACKGROUND

Mooring refers to the process of using mooring equipment to make a vessel, buoy, platform, etc. safely stay on an anchor, shore or mooring pontoon. The mooring system includes a dock, trestle berth, dolphin, mooring pontoon and another vessel to moor to. The bow is generally moored against the tide in ports with dominant tides and against the wind in ports where the wind scale goes to a force of over 4.

The traditional mooring device directly ties the vessel and platform, etc. to the dock or other equipment through cables. In case of tidal fluctuation or severe conditions like strong winds and waves, it is difficult to maintain the stability of the vessel or platform, especially a platform requiring high stability, for example, a nuclear reactor platform.

SUMMARY

In order to ensure the stability of the mooring of vessels, platforms and other equipment, the present invention provides a long-term mooring device.

In order to achieve the above objective, the present invention adopts the following technical solution: a long-term mooring device, where a support frame 8 is provided on a dock 12; the dock 12 is provided with a free guide roller 3; the free guide roller 3 is wound with a cable 9; one end of the cable 9 is horizontally connected to a spring 13 fixed on the dock 12, and the other end thereof is horizontally connected to a spring 13 fixed on a lower side of a cross arm of the support frame 8, through a free guide roller 3 provided on the lower side of the cross arm of the support frame 8 (corresponding to the free guide roller 3 on the dock 12); the middle of the cable 9 penetrates through an inertial induction self-locking connection joint 10 fixed on an end of a platform arm 11; the platform arm 11 is fixed on a platform 1.

The inertial induction self-locking connection joint 10 includes a housing 22 and fixtures 15; each fixture includes a chuck platform 20 and a chuck 19; chuck platforms 20 are provided along a circumferential direction inside the housing 22; a chuck slide rail 18 is provided on a front side of each chuck platform 20; a chuck 19 is slidably provided on the chuck slide rail 18; a front end of the chuck 19 is provided with an elastic friction layer 17; the chucks 19 in the circumferential direction define a central through hole 21; the housing 22 is provided with top and bottom holes corresponding to the through hole 21; each chuck 19 is connected to hydraulic devices 16 through the chuck platform 20; two guide wheels 14 are provided symmetrically on upper and lower sides of each fixture 15; the guide wheels 14 are connected between the housing 22 and the fixture 15; a tangent line of the guide wheels 14 in a vertical direction is located in the through hole 21.

The springs 13 are respectively provided in a spring sleeve 5; the two (upper and lower) spring sleeves 5 are respectively provided on the lower side of the cross arm of the support frame 8 and on the dock 12 through a support base 6.

Two anti-collision fairlead bases 4 are provided in correspondence in a vertical direction of the cable 9 below the cross arm of the support arm 8 and above the dock 12; the anti-collision fairlead bases 4 are respectively composed of legs 4-3 and a base surface 4-2; lower ends of the legs 4-3 are fixed on the lower side of the cross arm of the support frame 8 or on the dock 12; the base surface 4-2 is provided on the top of the legs 4-3; a center of the base surface 4-2 is provided with a limiting hole 4-1 for the cable 9 to penetrate through; an upper surface of the base surface 4-2 is made of an elastic material.

Roller supports 3-3 of the free guide rollers 3 are respectively provided on the lower side of the cross arm of the support arm 8 and on the dock 12; a roller is provided on an upper part of the roller support 3-3; the roller is provided with a roller groove 3-1 for winding the cable; an anti jumping baffle 3-2 is provided on the upper part of the roller support 3-3 on an outer side of the roller; a groove corresponding to the roller groove 3-1 is provided on an inner side of the anti jumping baffle 3-2.

Fenders 2 are provided between a side of the dock 12 and the platform 1.

The long-term mooring device of the present invention provides an omnidirectional restoring force for the moored platform through the elastic deformation of the springs to control the movement response of the platform within a certain range. Thus, the mooring system can adjust its vertical equilibrium position accordingly to adapt to the change in the vertical equilibrium position of the platform caused by tidal fluctuation. In extreme cases, the long-term mooring device fixes the position of the platform safely and quickly through the inertial induction self-locking connection joint to ensure the stability of the platform.

Figure 1:
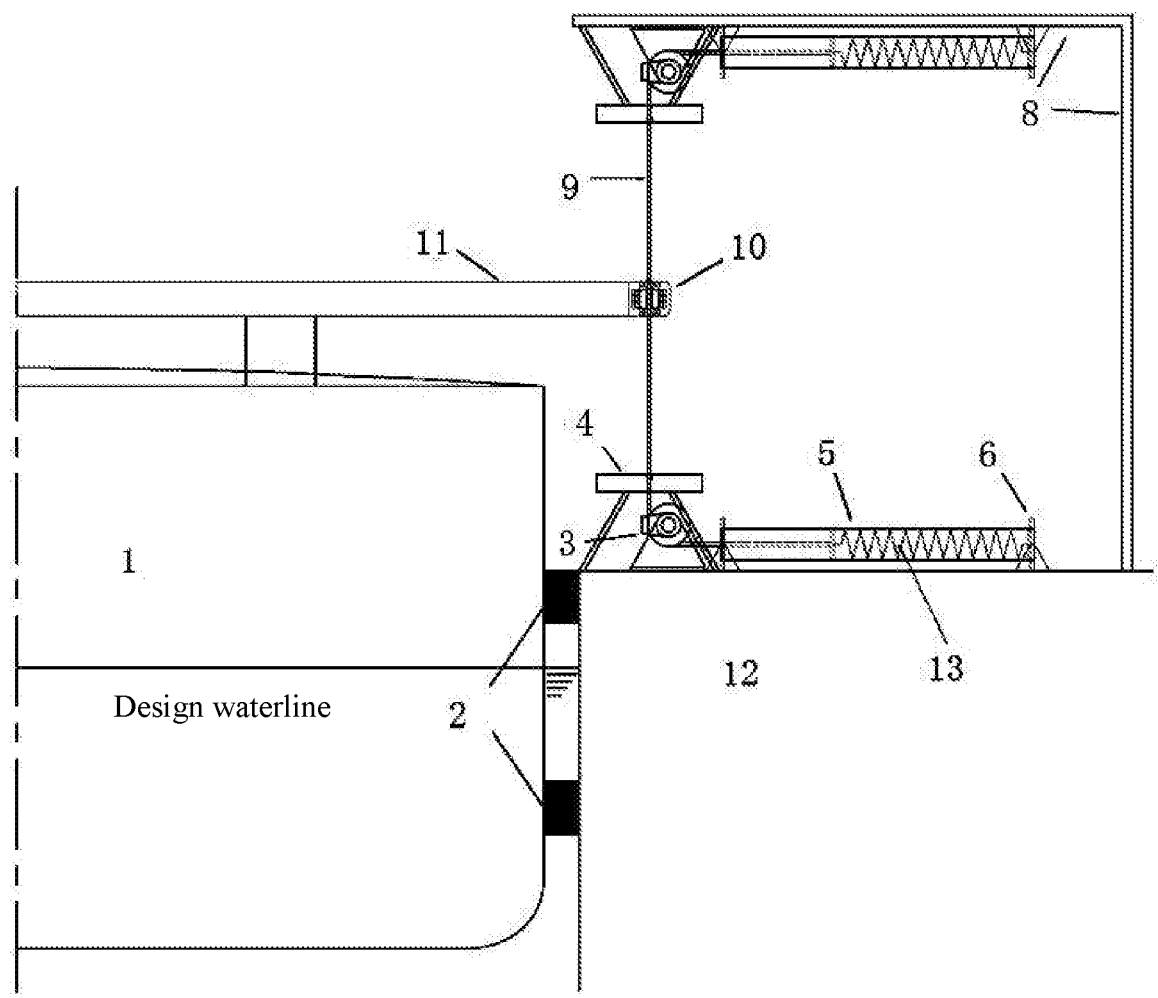
FIG. 1 is a front view of a long-term mooring device according to an example of the present invention.

Reference Numerals: 1. platform; 2. fender; 3. free guide roller; 3-1. roller groove; 3-2. anti jumping baffle; 3-3. roller support; 4. anti-collision fairlead base; 4-1. limiting hole; 4-2. base surface; 4-3. leg; 5. spring sleeve; 6. support base; 8 support frame; 9 cable; 10. inertial induction self-locking connection joint; 11. platform arm; 12. dock; 13. spring; 14. guide wheel; 15. fixture; 16. hydraulic device; 17. chuck elastic friction layer; 18. chuck slide rail; 19. chuck; 20. chuck platform; 21. through hole; and 22. housing.

DETAILED DESCRIPTION

An example of the present invention provides a long-term mooring device. As shown in FIG. 1, a support frame 8 is provided on a dock 12. The dock 12 is provided with a free guide roller 3. The free guide roller 3 is wound with a cable 9. One end of the cable 9 is horizontally connected to a spring 13 fixed on the dock 12, and the other end thereof is horizontally connected to a spring 13 fixed on a lower side of a cross arm of the support frame 8, through a free guide roller 3 provided on the lower side of the cross arm of the support frame 8 (corresponding to the free guide roller 3 on the dock 12). The middle of the cable 9 penetrates through an inertial induction self-locking connection joint 10 fixed on an end of a platform arm 11. The platform arm 11 is connected to a platform 1. The springs 13 are respectively provided in a spring sleeve 5. The two (upper and lower) spring sleeves 5 are respectively provided on the lower side of the cross arm of the support frame 8 and on the dock 12 through a support base 6. Fenders 2 are provided between a side of the dock 12 and the platform 1.

As shown in FIGS. 4 to 8, the inertial induction self-locking connection joint 10 includes a housing 22 and fixtures 15. Each fixture 15 includes a chuck platform 20 and a chuck 19. A plurality of chuck platforms 20 are provided along a circumferential direction inside the housing 22. A chuck slide rail 18 is provided on a front side of each chuck platform 20. A chuck 19 is slidably provided on the chuck slide rail 18. A front end of the chuck 19 is provided with an elastic friction layer 17. The chucks 19 in the circumferential direction define a through hole 21. The housing 22 is provided with top and bottom holes corresponding to the through hole 21. Each chuck 19 is connected to hydraulic devices 16 through the chuck platform 20. Two guide wheels 14 are provided symmetrically on upper and lower sides of each fixture 15. The guide wheels 14 are connected between the housing 22 and the fixture 15. A tangent line of the guide wheels 14 in a vertical direction is located in the through hole 21. The inertial induction self-locking connection joint 10 is provided therein with inertial induction electronic components in addition to the free guide wheels 14 and fixtures 15. The inertial induction electronic components and the hydraulic device 16 are connected to a drive control mechanism. When an inertial induction electronic component measures a sharp increase in acceleration, it transmits a signal to the drive control mechanism. The drive control mechanism controls the hydraulic devices 16 at the rear of the chuck 19 to push the fixture 15 forward to clamp the cable, thereby achieving locking. The drive control mechanism can also actively control the fixture to clamp. Each fixture can be independently controlled. The chuck 19 and the rear chuck platform 20 of the fixture are slidably connected by the slide rail 18 that is vertical. The drive control mechanism can actively control the chuck 19 to move up and down along the slide rail 18.

Figure 2:
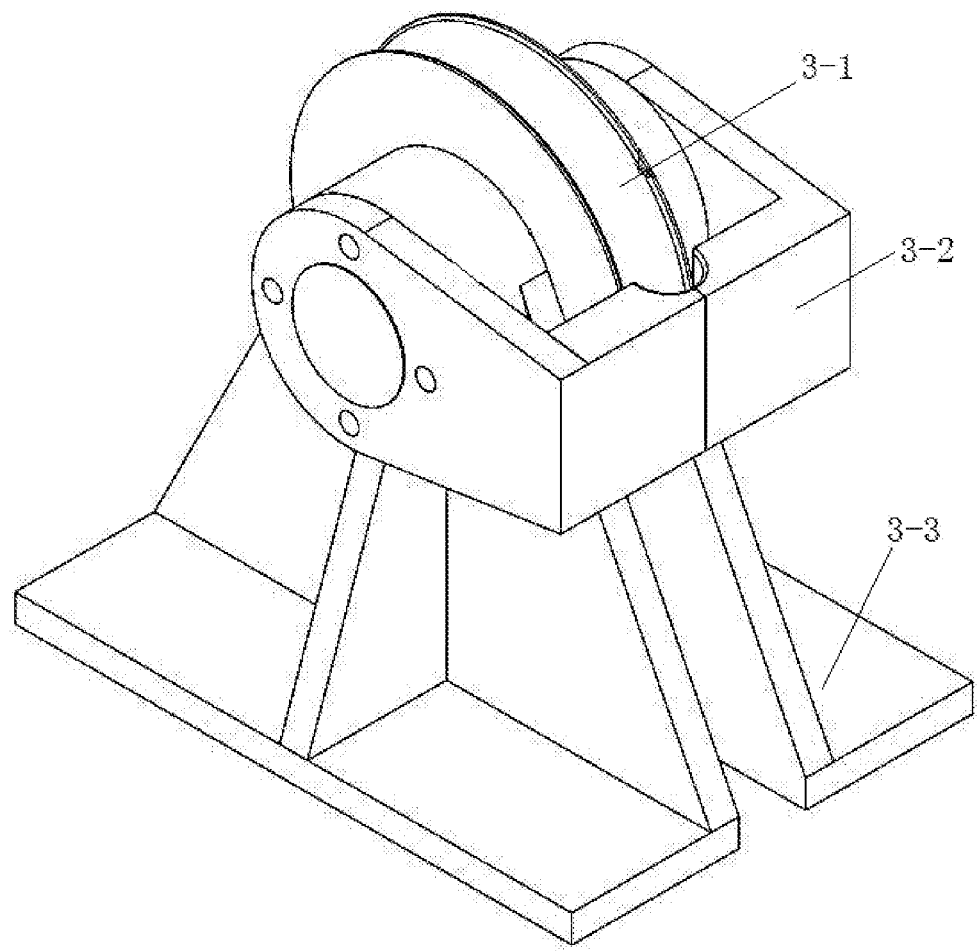
FIG. 2 is a structural view of a free guide roller of the long-term mooring device according to the present invention.

As shown in FIG. 2, roller supports 3-3 of the free guide rollers 3 are respectively provided on the lower side of the cross arm of the support frame 8 and on the dock 12. A roller is provided on an upper part of the roller support 3-3, and the roller is provided with a roller groove 3-1 for winding the cable. An anti jumping baffle 3-2 is provided on the upper part of the roller support 3-3 on an outer side of the roller. A groove corresponding to the roller groove 3-1 is provided on an inner side of the anti jumping baffle 3-2 to prevent the cable from leaving the roller groove 3-1.

Figure 3:
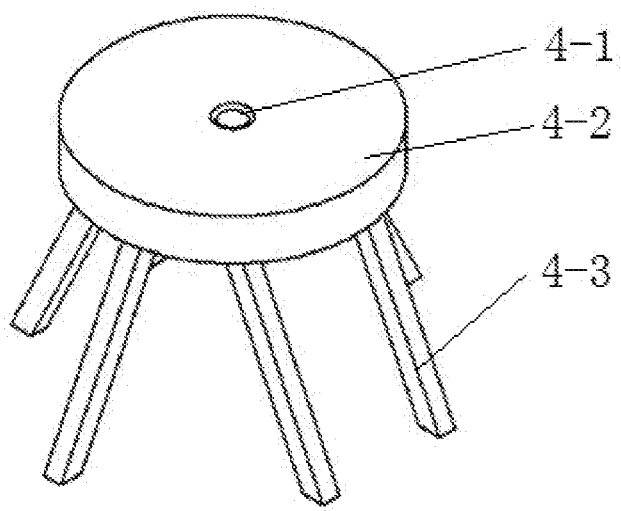
FIG. 3 is a structural view of an anti-collision fairlead base of the long-term mooring device according to the present invention.
Figure 4:
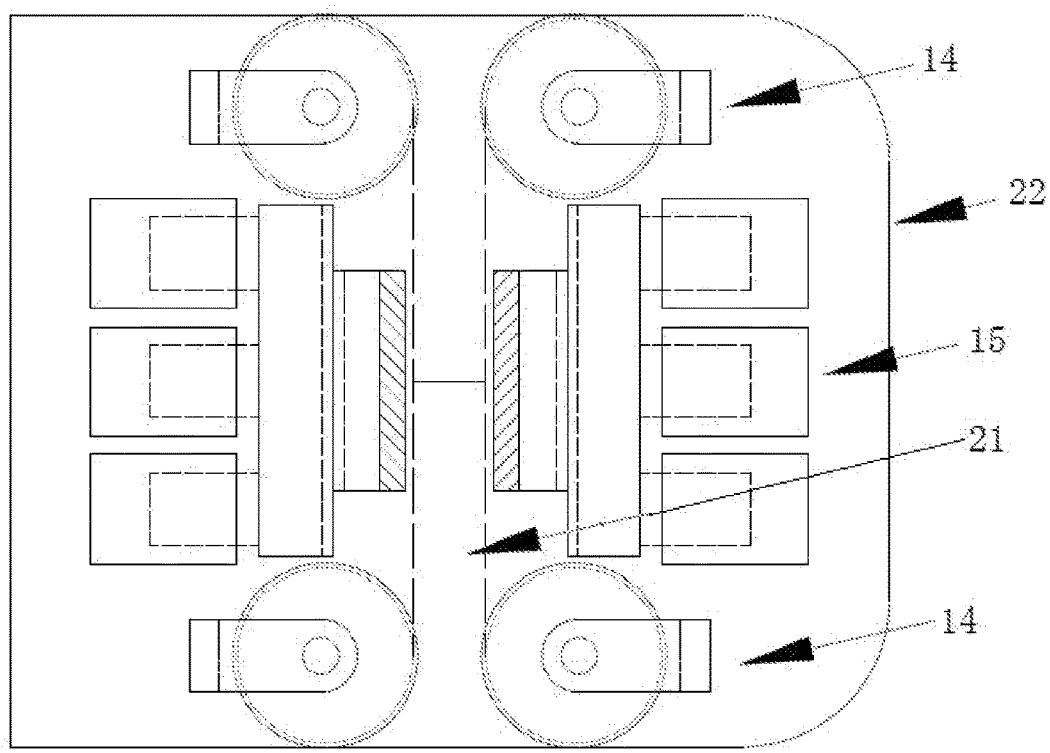
FIG. 4 is a side section view of an inertial induction self-locking connection joint of the long-term mooring device according to the present invention.
Figure 5:
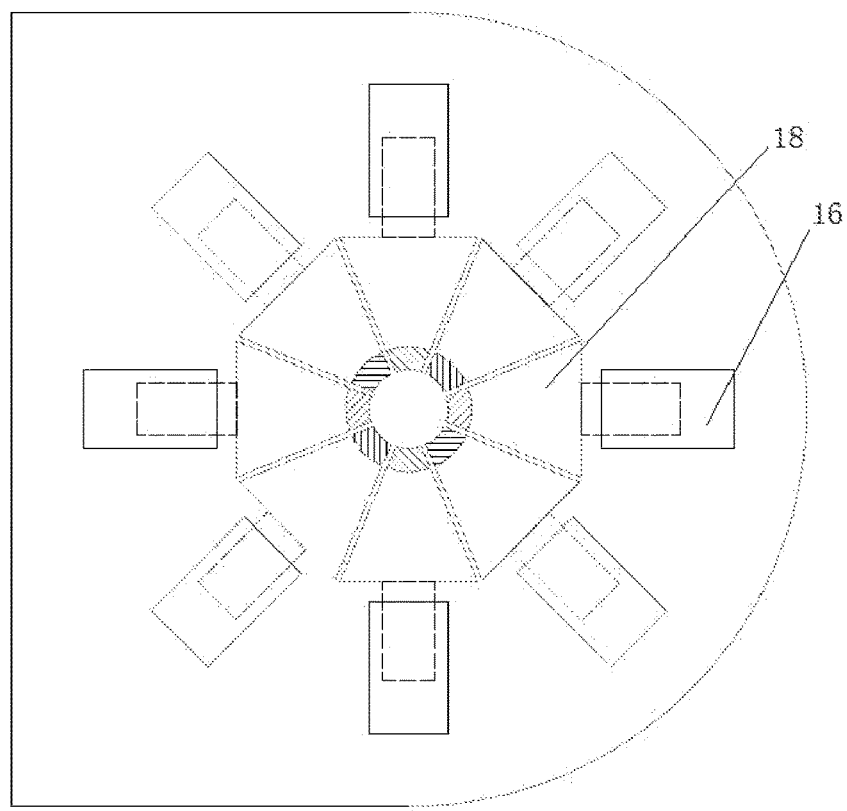
FIG. 5 is a top view of fixtures of the inertial induction self-locking connection joint of the long-term mooring device according to the present invention.
Figure 6:
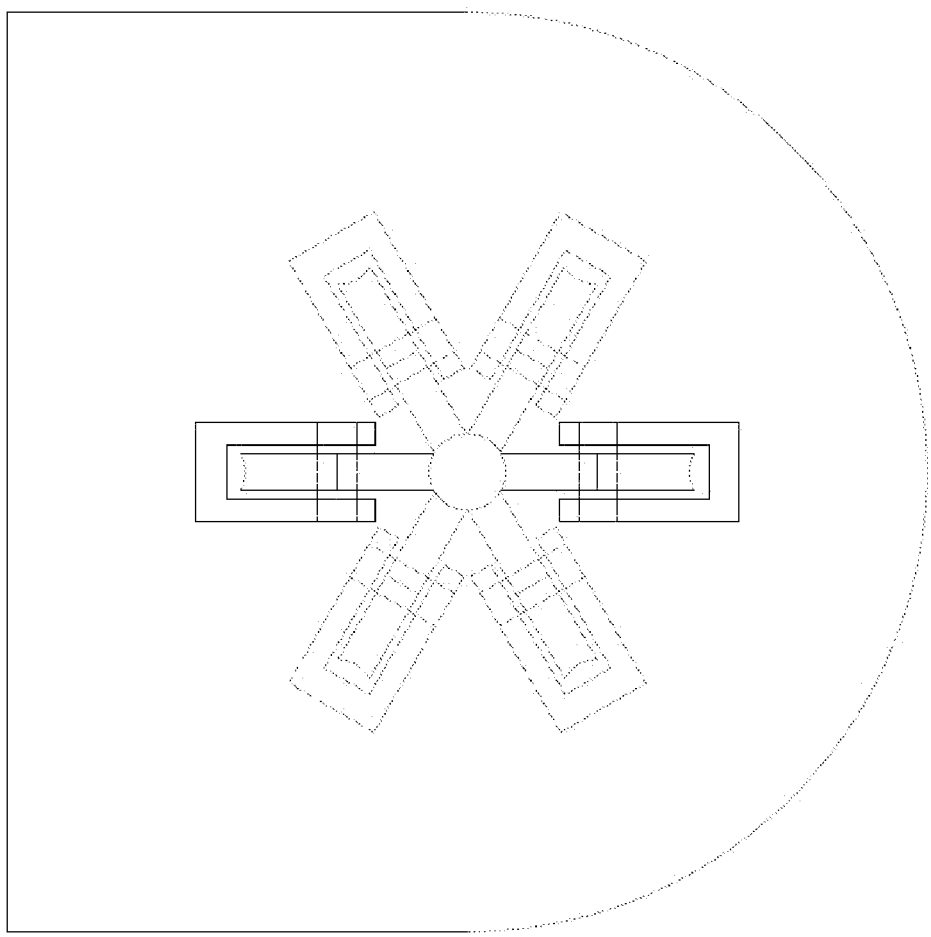
FIG. 6 is a top view of guide wheels of the inertial induction self-locking connection joint of the long-term mooring device according to the present invention.
Figure 7:
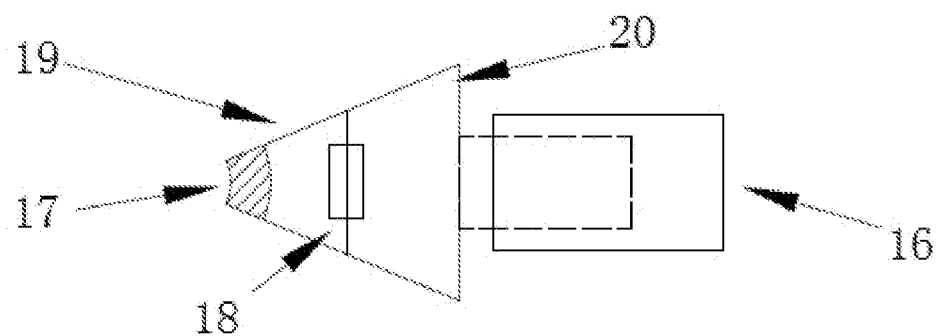
FIG. 7 is an installation view of a chuck and a fixture of the inertial induction self-locking connection joint of the long-term mooring device according to the present invention.
Figure 8:
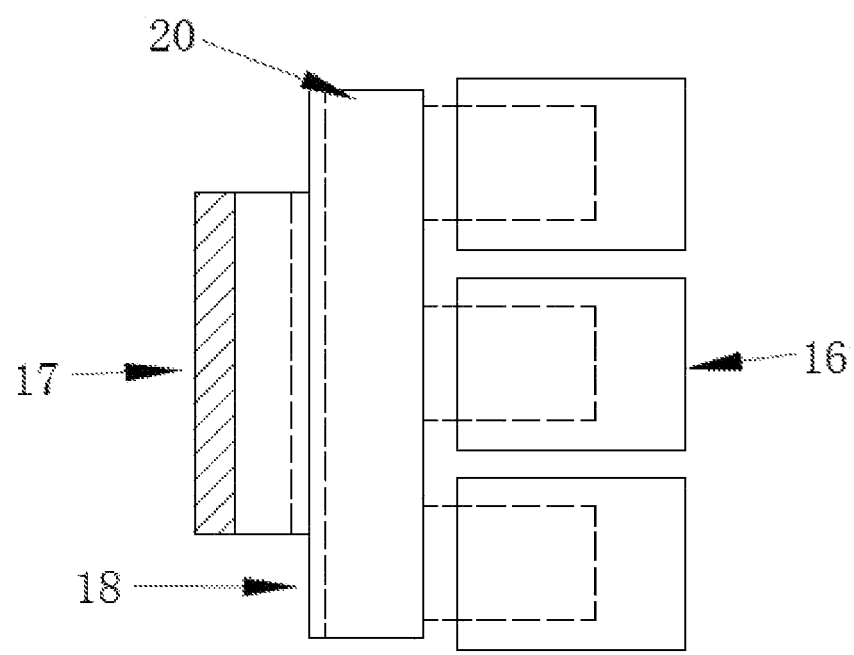
FIG. 8 is a front view of a fixture of the inertial induction self-locking connection joint of the long-term mooring device according to the present invention.

Two anti-collision fairlead bases 4 are provided in correspondence in a vertical direction of the cable 9 below the cross arm of the support arm 8 and above the dock 12. As shown in FIG. 3, the anti-collision fairlead bases 4 are respectively composed of legs 4-3 and a base surface 4-2. Lower ends of the legs 4-3 are fixed on the cross arm of the support frame 8 or the dock 12. The base surface 4-2 is provided on the top of the legs 4-3. A center of the base surface 4-2 is provided with a limiting hole 4-1 for the cable 9 to penetrate through. An upper surface of the base surface 4-2 is made of an elastic material to buffer an impact of the platform arm 11 during movement. The limiting hole 4-1 in the center can limit the horizontal movement of the cable 9.

The long-term mooring device works as follows:

(1) In the absence of strong storms: The springs in the spring sleeves 5 do not stretch. When the tied platform slowly rises and falls as a whole due to tidal fluctuation, the fixtures in the inertial induction self-locking connection joint 10 do not clamp, and the cable 9 can move freely in the vertical direction through the central through hole 21 of the inertial induction self-locking connection joint 10. In this way, the moored platform can freely rise and fall with the tidal level without causing additional load to the mooring system.

(2) When an instantaneous external load such as a gust of wind acts on the platform, the platform and the mooring mechanism will produce a movement with large acceleration, and the cable 9 is clamped by the fixtures in the inertial induction self-locking connection joint 10. The movement of the platform will drive the springs in the spring sleeves 5 to stretch, thereby providing a restoring force to resist the accidental load.

(3) In the presence of strong winds and waves (storm surges):

In case of short-term severe conditions, the fixtures in the inertial induction self-locking connection joint 10 clamp the cable and lock the mooring system in an equilibrium position, and the springs in the spring sleeves 5 expand and contract to provide the platform with an omnidirectional restoring force.

In case of long-term severe conditions, the tidal level may change significantly due to storm surges, etc. In order to avoid platform tilting and extra load caused by the lock of the equilibrium position of the mooring system, the mooring system is adjusted according to tidal fluctuation.

The hydraulic devices 16 which form a rear part of the fixtures 15 are controlled, and four fixtures that are not adjacent to each other are moved backwards and release their chucks.

The chucks 19 of the four fixtures are controlled to move along the chuck slide rails 18 in the direction of tidal fluctuation and reach a maximum displacement position of the chuck slide rails 18. Then corresponding hydraulic devices 16 are controlled to move forwards to cause the four chucks to re-clamp.

The hydraulic devices 16 at the rear of the other four fixtures 15 are controlled to proceed according to the above steps.

When the eight chucks 19 are all moved to the maximum displacement position of the chuck slide rails 16, the chucks 19 are simultaneously controlled to move in a direction opposite to tidal fluctuation.

The above procedure is repeated until the mooring system is readjusted to the equilibrium position.

The present invention is described with reference to the examples, and those skilled in the art should know that various changes or equivalent substitutions can be made to the features and examples of the present invention without departing from the spirit and scope of the present invention. In addition, under the concept of the present invention, these features and examples can be modified to adapt to specific conditions and materials without departing from the spirit and scope of the present invention. Therefore, the present invention is not limited by the disclosed specific examples, and all examples falling within the scope of the claims of this application should belong to the protection scope of the present invention.

What is claimed is:

1. A mooring device, wherein a support frame (8) is provided on a dock (12); the dock (12) is provided with a free guide roller (3); the free guide roller (3) is wound with a cable (9); one end of the cable (9) is horizontally connected to a first spring (13) fixed on the dock (12), and an other end thereof is horizontally connected to a second spring (13) fixed on a lower side of a cross arm of the support frame (8), through a free guide roller (3) which is provided on the lower side of the cross arm of the support frame (8) and corresponds to the free guide roller (3) on the dock (12); a middle of the cable (9) penetrates through an inertial induction self-locking connection joint (10) fixed on an end of a platform arm (11); the platform arm (11) is fixed on a platform (1).

2. The mooring device according to claim 1, wherein the inertial induction self-locking connection joint (10) comprises a housing (22) and fixtures (15); each fixture comprises chuck platforms (20) and chucks (19); the chuck platforms (20) are provided along a circumferential direction inside the housing (22); chuck slide rails (18) are provided on a front side of the chuck platforms (20) respectively; the chucks (19) are slidably provided on the chuck slide rails (18) respectively; front ends of the chucks (19) each are provided with an elastic friction layer (17); the chucks (19) in the circumferential direction define a central through hole (21); the housing (22) is provided with top and bottom holes corresponding to the through hole (21); the chucks (19) are connected to hydraulic devices (16) through the chuck platforms (20) respectively; two guide wheels (14) are provided symmetrically on upper and lower sides of the fixtures (15); the guide wheels (14) are connected between the housing (22) and the fixtures (15); a tangent line of the guide wheels (14) in a vertical direction is located in the through hole (21).

3. The mooring device according to claim 1, wherein the first spring and the second spring (13) are respectively provided in an upper spring sleeve and a lower spring sleeve (5); the upper spring sleeve and the lower spring sleeve (5) are respectively provided on lower sides of cross arms of the support frame (8) or on the dock (12) through support bases (6).

4. The mooring device according to claim 1, wherein two anti-collision fairlead bases (4) are provided in correspondence in a vertical direction of the cable (9) below the cross arm of the support arm (8) and above the dock (12); the anti-collision fairlead bases (4) are respectively composed of legs (4-3) and a base surface (4-2); lower ends of the legs (4-3) are fixed on the lower side of the cross arm of the support frame (8) or on the dock (13); the base surface (4-2) is provided on the top of the legs (4-3); a center of the base surface (4-2) is provided with a limiting hole (4-1) for the cable (9) to penetrate through; an upper surface of the base surface (4-2) is made of an elastic material.

5. The mooring device according to claim 1, wherein roller supports (3-3) of the free guide rollers (3) are respectively provided on the lower side of the cross arm of the support frame (8) and on the dock (13); a roller is provided on an upper part of the roller support (3-3); the roller is provided with a roller groove (3-1) for winding the cable; an anti-jumping baffle (3-2) is provided on the upper part of the roller support (3-3) on an outer side of the roller; a groove corresponding to the roller groove (3-1) is provided on an inner side of the anti-jumping baffle (3-2).

6. The mooring device according to claim 1, wherein fenders (2) are provided between a side of the dock (12) and the platform (1).

* * * * *